(12) United States Patent
Boll

(10) Patent No.: US 7,995,255 B2
(45) Date of Patent: Aug. 9, 2011

(54) SYSTEM AND METHOD FOR SCULPTED GAMUT COLOR CONVERSION

(75) Inventor: Harold Boll, Lexington, MA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/125,378

(22) Filed: May 22, 2008

(65) Prior Publication Data
US 2009/0290172 A1 Nov. 26, 2009

(51) Int. Cl.
H04N 1/60 (2006.01)
(52) U.S. Cl. .......... 358/518; 358/1.9; 358/520; 358/529
(58) Field of Classification Search .................... 358/1.9, 358/518, 520, 529; 382/162, 167
See application file for complete search history.

(56) References Cited

U.S. PATENT DOCUMENTS

| | | | | |
|---|---|---|---|---|
| 5,553,199 A * | 9/1996 | Spaulding et al. | ............. | 358/1.9 |
| 6,778,300 B1 * | 8/2004 | Kohler | ............. | 358/529 |
| 7,206,100 B2 * | 4/2007 | Namikata | ............. | 358/518 |
| 7,304,767 B2 * | 12/2007 | Sasaki et al. | ............. | 358/1.9 |
| 7,483,174 B2 * | 1/2009 | Tadas | ............. | 358/1.9 |
| 2003/0072018 A1 * | 4/2003 | Sasaki et al. | ............. | 358/1.9 |
| 2004/0096104 A1 * | 5/2004 | Terekhov | ............. | 358/518 |

* cited by examiner

Primary Examiner — Kimberly A Williams
(74) Attorney, Agent, or Firm — SoCal IP Law Group LLP; Steven C. Sereboff; Jonathan Pearce

(57) ABSTRACT

The subject application is directed to a system and method for sculpted gamut color conversion. First gamut data is received related to a first color gamut defined by a primary color space having no black component. Second gamut data is then received related to a second color gamut defined by a primary color space inclusive of a black component. At least one first color value of the first color gamut is then mapped to a second color value of a portion of the second color gamut disposed outside of the first gamut. At least one fractional black component value is then selected for each mapped color value. Non-black color data associated with each selected fractional black component is then identified. A sculpted gamut is then generated in accordance with each selected fractional black component and associated non-black color data. A color image is thereafter generated corresponding to received image data in accordance with the generated sculpted gamut.

19 Claims, 8 Drawing Sheets

SYSTEM AND METHOD FOR SCULPTED GAMUT COLOR CONVERSION

BACKGROUND OF THE INVENTION

The subject application is directed generally to color printing, and is particularly directed to improving color rendering of printed documents in accordance with ink or output medium characteristics of a particular output device. The application teaches a system and method wherein a sculpted gamut having improved output characteristics on a color rendering device is isolated and selected as a gamut disposed between those full gamuts associated with CMY and CMYK device colorants or toners.

As an introduction, a color space is typically a particular model of colors. For color image rendering devices, such as color printers, including ink jet printers, laser printers, solid color printers or dye sublimation printers, images are typically created by selective placement of color from a subtractive primary color system. Subtractive color primary systems function by selectively removing one or more colors from a multi-color light source, such as white light. This is to be contrasted with an additive primary color system wherein colors are created by selective addition of light of various wavelengths to achieve a desired color output. An additive color spectrum, such as red-green-blue (RGB) is suitably used in an active device, such a color display or color projector.

Common subtractive primary colors include the primary color set of cyan-magenta-yellow (CMY). Selectively mixing various proportions of these three colors allows for creation of various colors. An amount of each of these primary colors can be varied from 0% to 100%. Pure cyan is suitably denoted as (100, 0, 0), pure magenta as (0, 100, 0) and pure yellow as (0, 0, 100). Since three degrees of freedom can define a three dimensional object in a three-dimensional space, it will be appreciated that varying each component between 0% to 100% relative to one another will generate a three dimensional, six surface cube in color space which encompasses all possible colors that can be rendered with the primary set. This CMY cube is referred to as a gamut in this device color space.

Addition of black to the CMY color space results in a color space referred to as CMYK. With the addition of black, the resultant color gamut is extended beyond that of CMY in the shadows. The CMYK device color space is suitably modeled as a dodecahedron, which is a twelve surface solid. The addition of K is suitably modeled by separating the top and bottom 3 surfaces of the CMY cube and maintaining connecting along edges and corners. This forms the dodecahedron whose greater volume is reflective of the greater gamut extent of the CMYK device color space.

Use of CMYK permits better visual rendering of color images by increasing the tonal range. However, care must be taken in its application in order to avoid introduction of visual artifacts in an output image.

SUMMARY OF THE INVENTION

In accordance with one embodiment of the subject application, there is provided a system and method for improving color rendering of printed documents in accordance with ink or output medium characteristics of a particular output device.

Further, in accordance with one embodiment of the subject application, there is provided a sculpted gamut having improved output characteristics on a color rendering device is created and selected as a gamut disposed between those full gamuts associated with CMY and CMYK color spaces.

Still further, in accordance with one embodiment of the subject application, there is provided a system for sculpted gamut color conversion. The system includes means adapted for receiving first gamut data related to a first color gamut defined by a primary color space having no black component and means adapted for receiving second gamut data related to a second color gamut defined by the primary color space inclusive of a black component. The system also includes mapping means adapted for mapping at least one first color value of the first color gamut to a second color value of a portion of the second color gamut disposed outside of the first gamut and selection means adapted for selecting at least one fractional black component value for each mapped color value. The system further comprises means adapted for identifying non-black color data associated with each selected fractional black component, means adapted for generating a sculpted gamut in accordance with each selected fractional black component and associated non-black color data, and means adapted for generating a color image corresponding to received image data in accordance with a generated sculpted gamut.

In one embodiment of the subject application, the first gamut data corresponds to CMY color space and the second color gamut data corresponds to CMYK color space.

In another embodiment of the subject application, the fractional black component value is associated with an L* value and the non-black color data is associated with a*b* values in L*a*b*color space.

In yet another embodiment of the subject application, the system further comprises means adapted for identifying ray data corresponding to a set of functionally related data points defined in accordance with the first gamut data and the second gamut data.

In a further embodiment of the subject application, the selection means includes means adapted for selecting the at least one fractional black component in accordance with identified ray data.

In another embodiment of the subject application, the selection means further includes means adapted for selecting the at least one fractional black component in accordance with a saturation level associated with non-black color data associated therewith.

Still further, in accordance with one embodiment of the subject application, there is provided a method for sculpted gamut color conversion in accordance with the system as set forth above.

Still other advantages, aspects and features of the subject application will become readily apparent to those skilled in the art from the following description wherein there is shown and described a preferred embodiment of the subject application, simply by way of illustration of one of the modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for improving the output of color documents. In particular, the subject application is directed to a system and method for improving color rendering of printed documents in accordance with ink or output medium characteristics of a particular output device. It will become apparent to those skilled in the art that the system and method described herein are suitably adapted to a plurality of varying electronic fields employing image processing, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
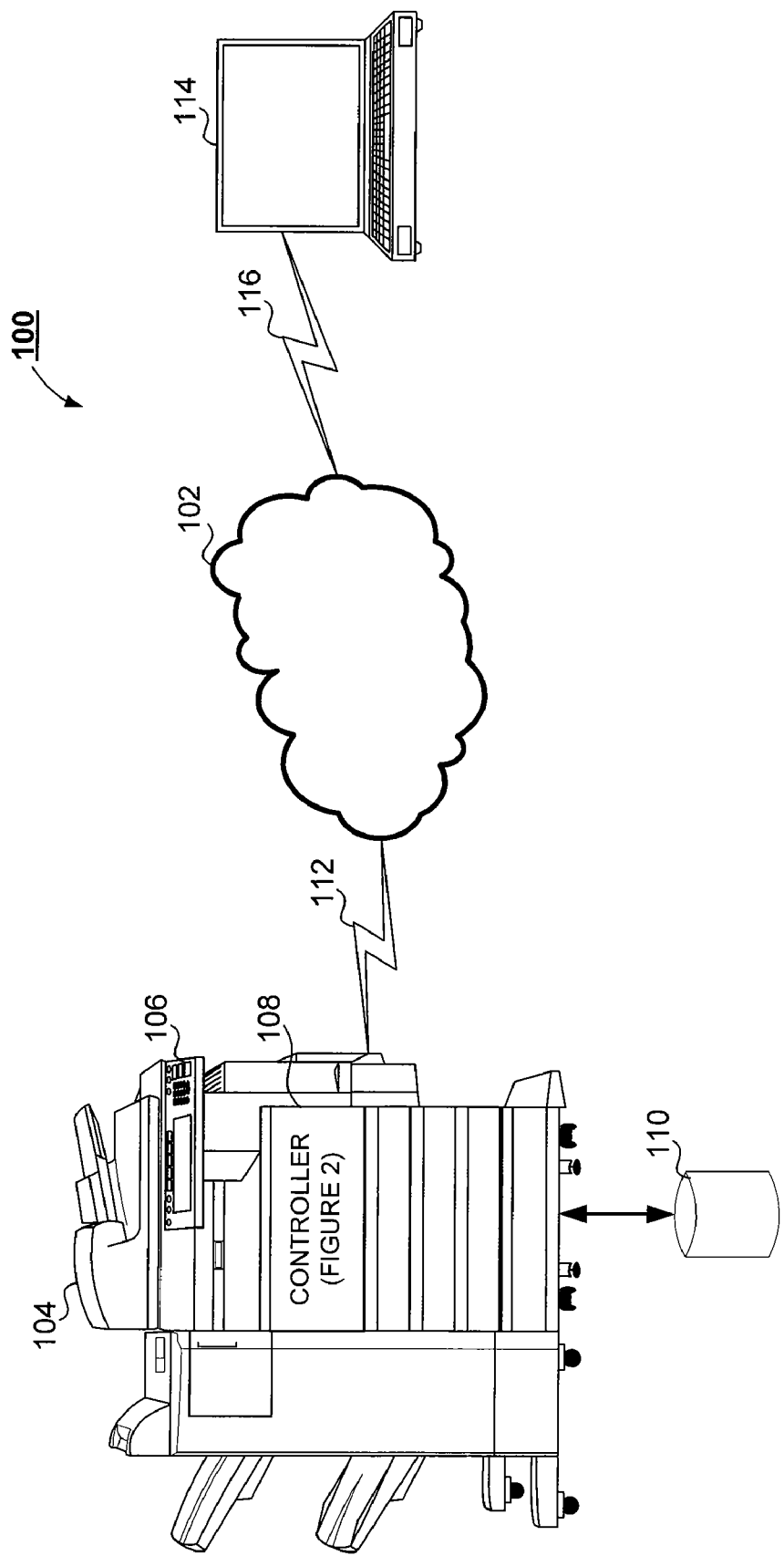
FIG. 1 is an overall diagram of a system showing a suitable hardware environment for sculpted gamut color conversion according to one embodiment of the subject application.

Referring now to FIG. 1, there is shown an overall diagram of a system 100 for sculpted gamut color conversion in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for sculpted gamut color conversion of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

Figure 2:
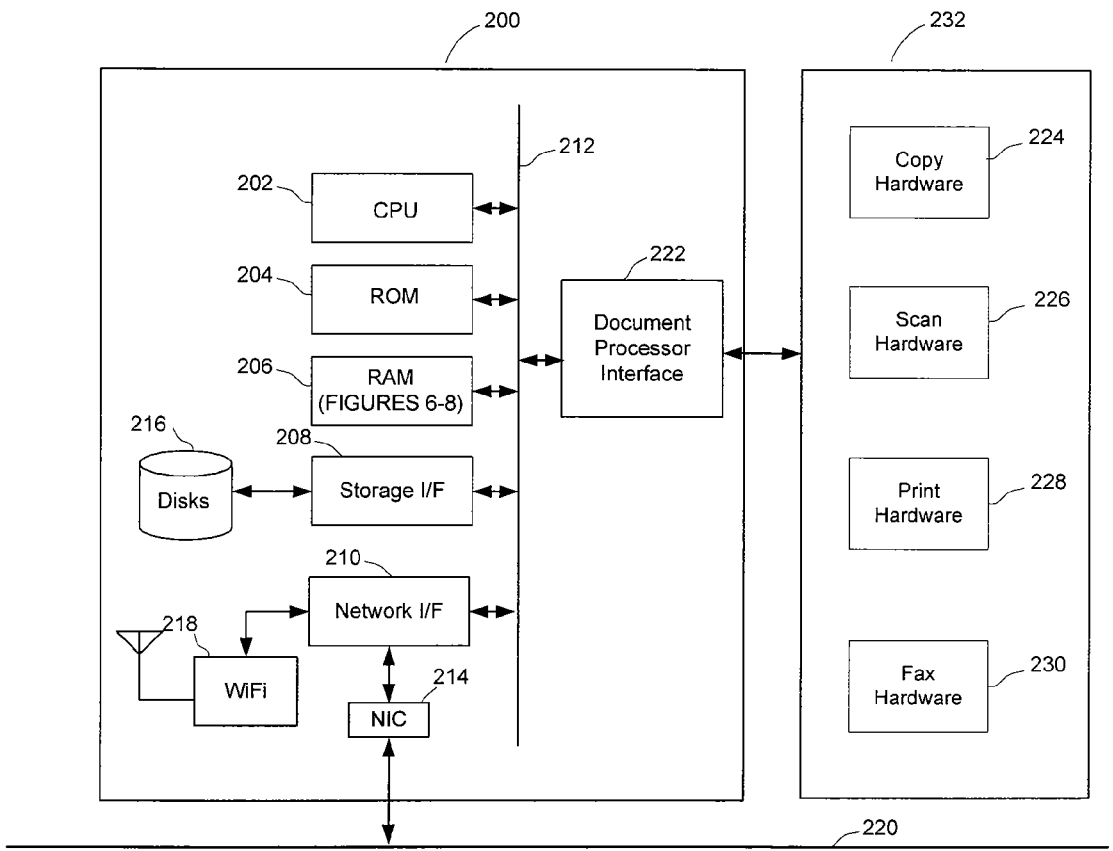
FIG. 2 is a block diagram illustrating controller hardware for use in the system for sculpted gamut color conversion according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
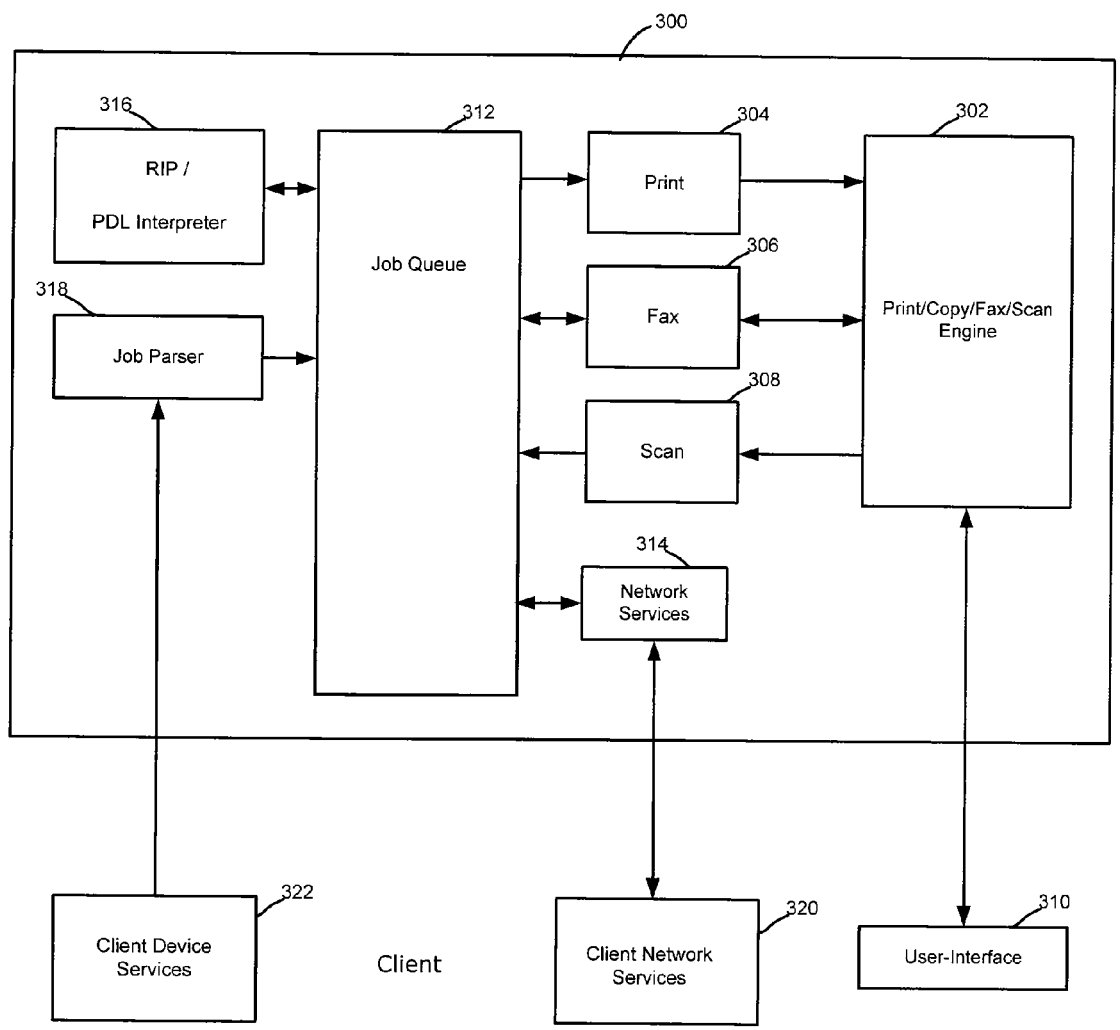
FIG. 3 is a functional diagram illustrating the controller for use in the system for sculpted gamut color conversion according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. Suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controllers does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

In operation, first gamut data is received related to a first color gamut defined by a primary color space having no black component. Second gamut data is then received related to a second color gamut defined by the primary color space inclusive of a black component. At least one first color value of the first color gamut is then mapped to a second color value of a portion of the second color gamut disposed outside the first gamut. At least one fractional black component value is then selected for each mapped color value. Non-black color data associated with each selected fractional black component is then identified. A sculpted gamut is then generated in accordance with each selected fractional black component and associated non-black color data. An image gamut is an important component in an image rendering process.

In accordance with one example embodiment of the subject application, electronic image data is first received by the document processing device 104 from the user device 114, via operation of the document processing device 104, via portable storage media, and the like. It will be understood by those skilled in the art that reference to the document processing device 104 as the document rendering device is for example purposes only, and other devices, such as the user device 114, are capable of processing the color data in accordance with the systems and methods described herein. The skilled artisan will further appreciate that the electronic image data includes color data representing colors associated with the electronic image, e.g., an image in a Red, Green, Blue (RGB) color space. The controller 108 or other suitable processing component associated with the document processing device 104 then receives first gamut data related to a first color gamut of the associated document rendering device 104 and corresponding to Cyan, Magenta, Yellow (CMY) color space. This gamut is an important component in an image rendering processing chain. Second gamut data related to a second color gamut of the associated document rendering device 104 and corresponding to Cyan, Magenta, Yellow, Black (CMYK) color space is then received by the controller 108. It will be appreciated by those skilled in the art that for CMY colorant sets, e.g., the toner output of the document processing device in CMY color space, this receipt entails, for example and without limitation, the sampling of six surfaces of a cube in the CMY color space. Each side represents two colorants, varying from 0 to 100 percent while the single remaining colorant, is constant at 0% or 100%. Each point on the cube surface in ink space maps to a corresponding point on the gamut surface in color space, such as, for example and without limitation L*a*b*, or the like. The skilled artisan will further appreciate that for CMYK ink sets, the algorithmically equivalent geometric solid is a twelve-surface (facets) dodecahedron, each facet of which displays similar properties as the surfaces of the cube in the CMY device color space. That is, for each facet, two inks vary while the remaining two inks remain fixed at their respective minimum or maximum values.

The building of a sculpted gamut essentially reduces to providing both the target L*a*b* value which will become the sculpted boundary position and its corresponding black (K) value. It should be noted that while these values are linked, as will be understood by those skilled in the art, the determination of such values occurs in two distinct steps, discussed in greater detail below. It will be further appreciated by those skilled in the art that the pre-computing of the CMY and CMYK gamuts provides guidance in how to optimally choose these two related parameters. Thus, the CMYK gamut provides both the maximal position (L*a*b* values) and the associated maximum black (K) value; similarly the CMY gamut provides the minimum possible position and the minimum possible black (K) value. The computation of the L*a*b* and black (K) values of the sculpted gamut is discussed in greater detail below.

Figure 4:
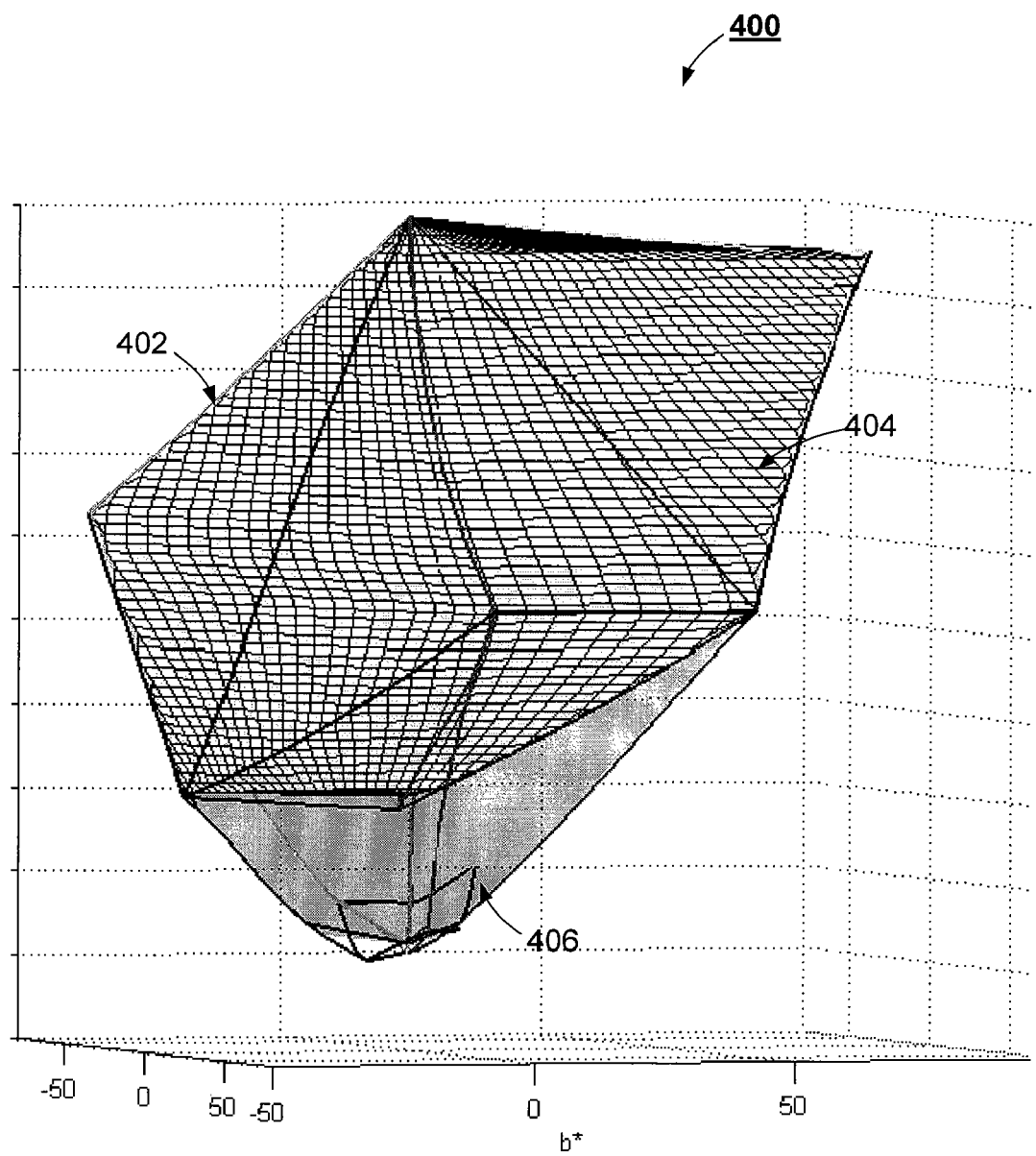
FIG. 4 is a graph illustrating a mapping of a CMY gamut to a CMYK gamut for use in the method for sculpted gamut color conversion according to one embodiment of the subject application.

At least one first color value of the first color gamut is then mapped to a second color value of a portion of the second color gamut disposed outside the first color gamut. That is, a color value is mapped from the CMY gamut to a portion of the CMYK gamut that lies outside the CMY gamut, as will be understood by those skilled in the art. FIG. 4 depicts a graphical representation 400 illustrating a CMYK gamut 402 (shown as the edges in the representation 400) superimposed over a CMY gamut 404 (shown as a mesh in the representation 400). The portion of the second color gamut, e.g. the CMYK gamut 402 disposed outside the first color gamut, i.e. CMY gamut 404, is shown in FIG. 4 as the area 406. Ray data is then identified corresponding to a set of functionally related data points defined in accordance with the first gamut data and the second gamut data. As will be understood by those skilled in the art, the ray preferably emanates from a pivot point, such as the neutral axis at [a*b*]=[0 0], and intersects the CMY and CMYK gamuts.

Next, at least one fractional black (K) component value associated with an L* value is selected for each mapped color value according to identified ray data. Thus, an L*a*b* intersection with the CMY and CMYK gamuts is determined based upon the ray data. A selection of black (K) component rather than the L*a*b* color signifies the importance of maintaining a smooth global variation in black (K) throughout the gamut. Then a non-black color data associated with each selected fractional black (K) component is associated with a*b* values of a color value specified in L*a*b* color space.

A sculpted gamut is then generated by the controller 108 or other suitable component associated with the document processing device 104 according to the identified non-black color data and associated fractional black (K) component. The sculpted gamut is an important step in connection with an imaging rendering process. Such rendering is suitably accomplished via the controller 108 or other suitable component associated with the document processing device 104 in conjunction with the generated sculpted gamut.

In accordance with the above example embodiment, once the black (K) component has been ascertained, an L*a*b* value appropriate for the computed black (K) is then determined. The skilled artisan will appreciate that such a determination includes some degree of variance due to noise and other factors, known in the art. Thus, the skilled artisan will appreciate that the subject application places this variance in color space as opposed to ink space. During the initial implementation of the system and method of the subject application, the fractional black (K) component value is constant at a given L* value. Subsequent refinements during processing by the controller 108 or other suitable component associated with the document processing device enable the determination of the fractional black (K) component as both a function of L* and the ray data. A fractional black component is applied to the maximum black (K) value, as obtained from CMYK gamut, to obtain a sculpted black (K) value (sculpted (K)=fractional Value*maximum (K)), that value is fixed.

A determination is made as to a point along the ray intersecting the CMY and CMYK gamuts, from which to derive the L*a*b* value. As will be appreciated by those skilled in the art, the sculpted black (K) value allows for a range or set of possible L*a*b* values. Selection is preferably made therefrom based upon which L*a*b* value is farthest from neutral, i.e., the most saturated color. Thus, as will be apparent to those skilled in the art, the size of the sculpted gamut is maximized given the constraint of the diminished amount of black (K) employed. The graph illustrated in FIG. 5 depicts one embodiment for maximizing the size of the sculpted gamut given diminishing black (K) amounts.

Figure 5:
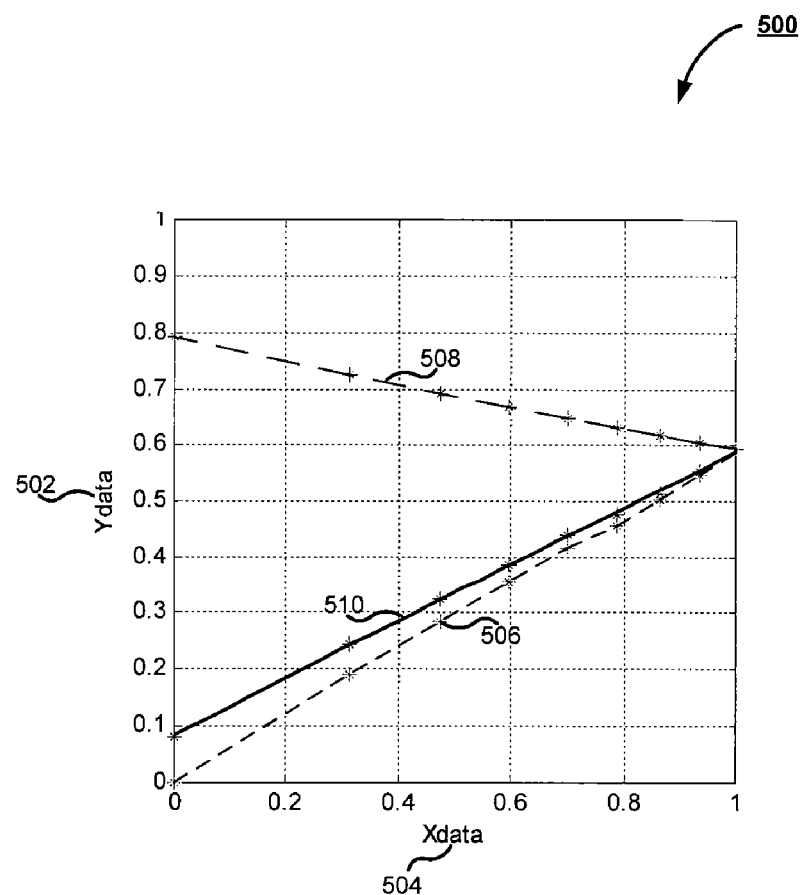
FIG. 5 is a graph illustrating Max/Min K (black) solution for normalized interval between CMY and CMYK gamuts.

As will be apparent to those skilled in the art, the sculpted black (K) value is suitably mapped to the Y-axis 502 of the graph 500 of FIG. 5. A line is then extended from the sculpted black (K) value on Y-axis 502 to the intersection with the minimum black (K) curve 506. The fractional distance in the normalized interval between the CMY and CMYK gamuts is then determined via reflection to the X-axis 504 for computation of the associated L*a*b* value. The skilled artisan will appreciate that during implementation of the subject application, the true minimum black (K) value is not used due to noise and other instabilities. Preferably, a curve 510 representing a polynomial fit of all the data points is utilized, which generally rides about 10% above the minimum black (K) values in the interval between the minimum 506 and maximum 508 black (K) solutions.

In accordance with another example embodiment of the subject application, a CMY gamut and a CMYK gamut are first built by the controller 108 or other suitable component associated with the document processing device 104 which bracket a range for a sculpted gamut. A skeletal gamut is then built so as to permit the optimal theta quantization as a function of L*. According to such an embodiment, the skeletal gamut further comprises major hue ramps from paper white to black point, as well as the gamut girdle. The quantization of the L* axis is then specified by the controller 108 or other suitable component associated with the document processing device 104.

To build the sculpted gamut at a constant L* plane basis, a ray is cast at a given [L* theta] value from a selected pivot point, e.g., neutral axis. The L*a*b* intersection with the CMY gamut and the CMYK gamut is then located. The maximum black (K) and the minimum black (K) inking solutions for 5 points in a normalized (0-1) interval between the CMY gamut and the CMYK gamut are then determined. The maximum black (K) and the minimum (K) values are then plotted, whereupon the Y-axis represents a percentage black (K) and the X-axis represents a normalized distance, e.g., FIG. 5 described above.

Fit points are then computed that are a predetermined percentage, e.g., 10%, between the minimum black (K) and the maximum black (K) values. A low order polynomial is then fit and a determination is made whether the computed points are monotonic. When the points are not monotonic, monotonicity is forced via fitting of a straight line, as will be understood by those skilled in the art. A fractional black (K) value is then independently obtained for the ray and the sculpted black (K) value is computed. The computed sculpted black (K) value and the minimum/maximum black (K) values are then used so as to determine the desired L*a*b* value. It will be appreciated by those skilled in the art that the L*a*b* value is analyzed so as to determine whether the value lies within the geometric bounds of the sculpted gamut, as defined by the CMY gamut and the CMYK gamuts. In the event that the value lies outside the bounds, the value is clipped to the nearest gamut. A forward model, as will be known in the art, is then inverted given the sculpted black (K) value and the associated L*a*b* value resulting in CMY inks. The computed L*a*b*/CMYK value is then stored in the associated data storage 110 of the document processing device 104 and operations continue for the next theta and succeeding L* planes.

Figure 6:
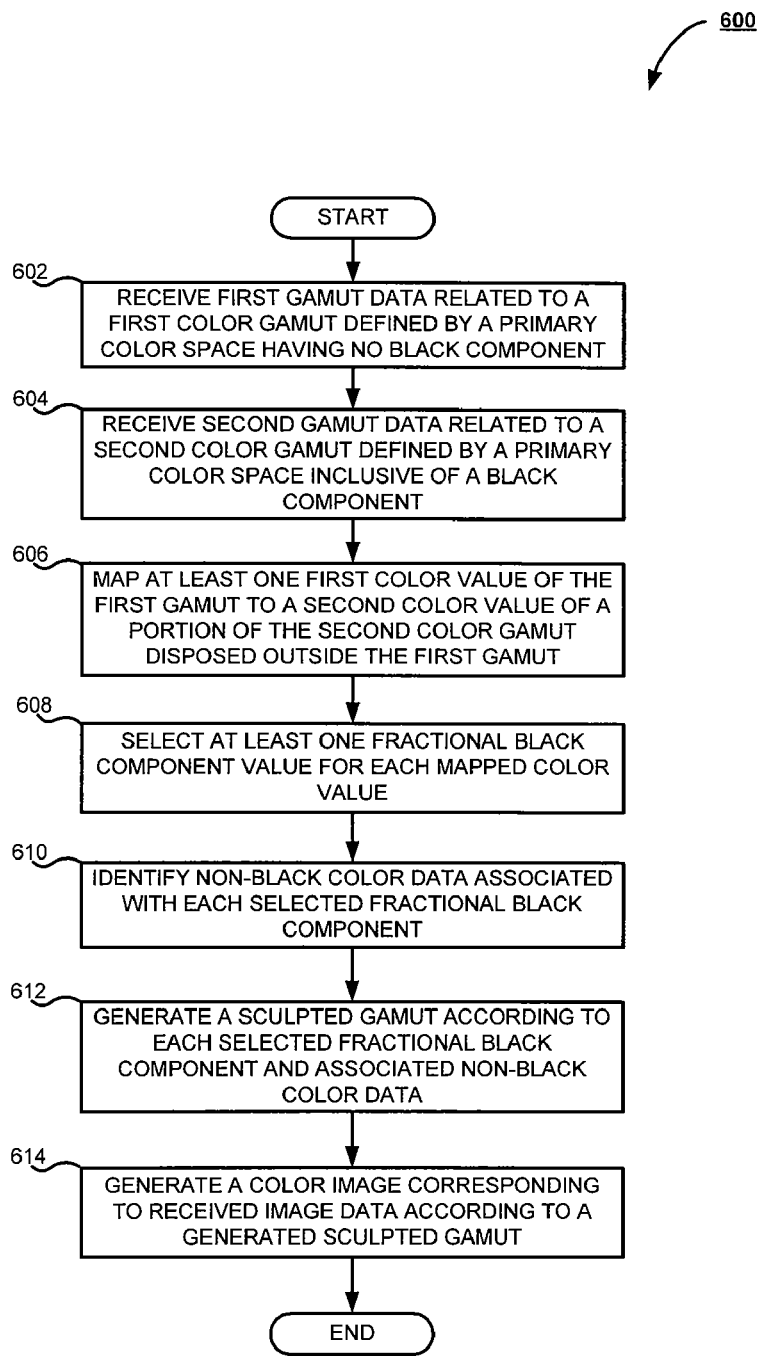
FIG. 6 is a flowchart illustrating a method for sculpted gamut color conversion according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6, FIG. 7, and FIG. 8. Turning now to FIG. 6, there is shown a flowchart 600 illustrating a method for sculpted gamut color conversion in accordance with one embodiment of the subject application. Beginning at step 602, first gamut data is received related to a first color gamut defined by a primary color space having no black component, e.g., CMY color space. It will be understood by those skilled in the art that reference is made hereinafter to the document processing device 104 as the document rendering device implementing the methodology depicted in FIG. 6 for example purposes only, and other devices, such as the user device 114, are capable of processing the color data in accordance with the systems and methods described herein. Second gamut data is then received at step 604 related to a second color gamut defined by the primary color space including a black component, e.g., CMYK color space.

Flow then proceeds to step 606, whereupon at least one first color value of the first color gamut is mapped to a second color value of a portion of the second color gamut disposed outside the first color gamut. A suitable example of the portion of a second color gamut outside the first color gamut is illustrated in FIG. 4 at 406. At step 608, at least one fractional black component value is selected for each mapped color value. Corresponding non-black color data associated with each selected fractional black component is then identified at step 610. A sculpted gamut is then generated at step 612 according to each selected fractional black component and associated non-black color data. At step 614, the controller 108 or other suitable component associated with the document processing device 104 generates a color image corresponding to received image data in accordance with a generated sculpted gamut.

Figure 7:
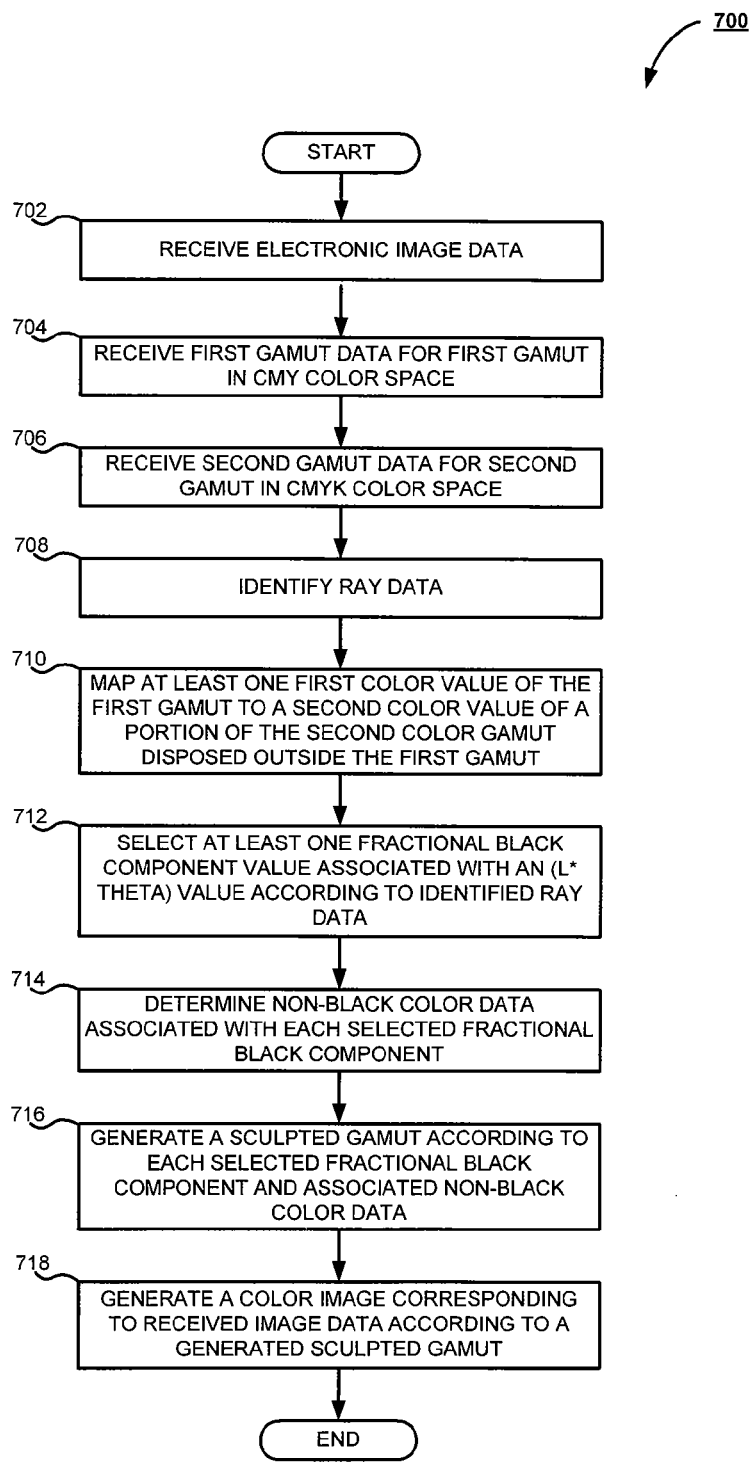
FIG. 7 is a flowchart illustrating a method for sculpted gamut color conversion according to one embodiment of the subject application.

Referring now to FIG. 7, there is shown a flowchart 700 illustrating a method for sculpted gamut color conversion in accordance with one embodiment of the subject application. The methodology depicted in FIG. 7 begins at step 702, whereupon electronic image data is received by the controller 108 of the document processing device 104 from the user device 114, from a portable storage medium, from operations of the document processing device 104, or the like. The skilled artisan will appreciate that the received electronic image data is capable of comprising color data, for example, in an additive color space such as RGB, or the like. At step 704, the controller 108 or other suitable component associated with the document processing device 104 receives first color gamut data related to a first color gamut defined by a device color space of the associated document rendering device 104 having no black component, e.g. CMY color space. The controller 108 then receives, at step 706, second gamut data related to a second color gamut defined by the device color space inclusive of a black component of the associated document rendering device 104, e.g. CMYK color space.

The skilled artisan will appreciate that for CMY ink or toner sets, e.g., the colored-toner capable of being output by the document processing device 104 in CMY color space, presents a gamut boundary descriptor (GBD). Preferably, each side of such a cube corresponds to two inks, varying from 0 to 100 percent, with the remaining ink is at its maximum (100%) or minimum (0%). Accordingly, each point on the surface of the cube in the ink space maps to a corresponding point on the gamut surface in the associated color space, e.g., L*a*b*, or the like. It will also be understood by those skilled in the art that for CMYK ink sets, e.g., ink including black (K) toner, the algorithmically equivalent geometric solid is represented as a twelve-faceted dodecahedron, with each facet thereof displaying properties similar to that of the CMY cube. That is, for each facet of the dodecahedron, two colorants, such as inks or toners, vary from 0 to 100 percent with the remaining two inks fixed at their respective minimum (0%) or maximum (100%) values.

As discussed in greater detail above, it will be appreciated by those skilled in the art that the building of the sculpted gamut essentially reduces to providing both the target L*a*b* value which will become the sculpted boundary position and its corresponding black (K) value. Furthermore, it will be understood by the skilled artisan that while these values are linked, the determination of such values occurs in two distinct steps, discussed in greater detail below. It will further be appreciated by the skilled artisan that the computing of the CMY and CMYK gamuts prior to the building of the sculpted gamut provides guidance in how to optimally choose these two related parameters. Therefore, the CMYK gamut provides both the maximal position (L*a*b* values) and the associated maximum black (K) value whereas the CMY gamut provides the minimum possible position and the minimum possible black (K) value.

Returning to FIG. 7, at step 708, ray data is identified corresponding to a set of functionally related data points defined in accordance with the first gamut data and the second gamut data. At step 710, at least one first color value of the first color gamut is then mapped to a second color value of a portion of the second color gamut disposed outside the first gamut, i.e., a color value is mapped from the CMY color gamut to the CMYK color gamut. As set forth in greater detail above, a suitable illustration of the portion of the second gamut disposed outside the first gamut is shown at 406 in FIG. 4. As will be understood by those skilled in the art, the ray preferably emanates from a pivot point, such as the neutral axis at [a*b*]=[0 0], and intersects the CMY and CMYK gamuts, which is described with respect to FIG. 5 above.

Flow continues to step 712, whereupon at least one fractional black (K) component value associated with an [L* Theta] value is selected for each mapped color value according to identified ray data. The skilled artisan will thus appreciate that an L*a*b* intersection with the CMY and CMYK gamuts is determined based upon the ray data. The skilled artisan will appreciate that the selection of black (K) component rather than the L*a*b* color signifies the importance of maintaining a smooth global variation in black (K) throughout the gamut. The controller 108 or other suitable processing component associated with the document processing device 104 determines at step 714 non-black color data associated with each selected fractional black (K) component associated with a*b* values of a color value specified in L*a*b* color space.

At step 716, a sculpted gamut according to each selected fractional black (K) component and associated CMY colorants is then generated. This sets up for generation a color image at step 718 by the controller 108 or other suitable component associated with the document processing device 104 corresponding to received image data in accordance with a generated sculpted gamut.

Figure 8:
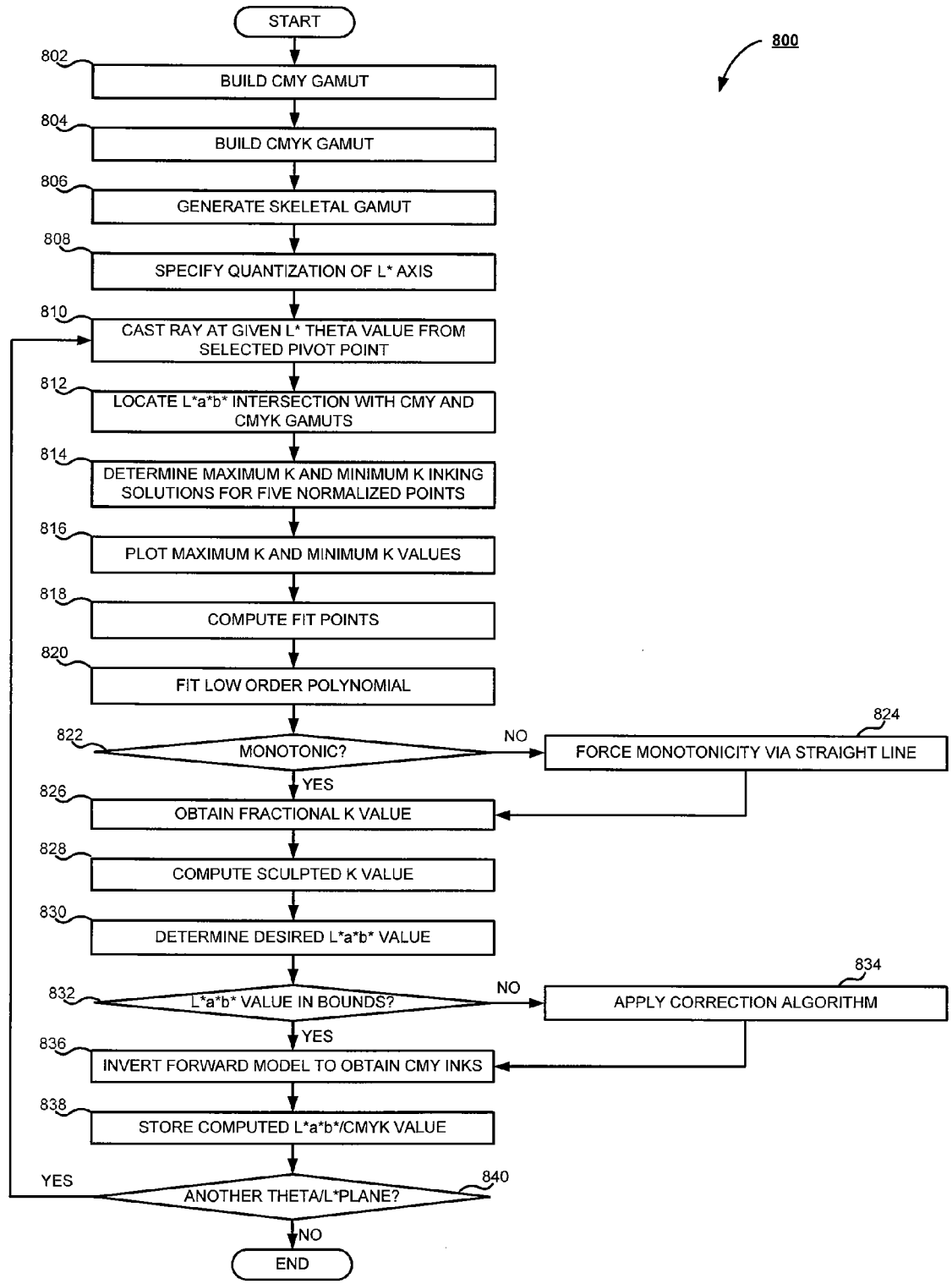
FIG. 8 is a flowchart illustrating a method for sculpted gamut color conversion according to one embodiment of the subject application.

With respect to FIG. 8, there is shown a flowchart 800 illustrating an example method for sculpted gamut color conversion in accordance with one embodiment of the subject application. The method of FIG. 8 begins at step 802, whereupon a CMY gamut is built by the controller 108 or other suitable component associated with the document processing device 104. At step 804, the controller 108 or other suitable component associated with the document processing device 104 builds a CMYK gamut. As will be understood by those skilled in the art, the CMY and CMYK gamuts bracket a range for the sculpted gamut in accordance with one embodiment of the subject application. A skeletal gamut is then generated by the controller 108 at step 806 so as to permit the optimal theta quantization as a function of L*. Preferably, the skeletal gamut includes major hue ramps from paper white to black point, as well as the gamut girdle. At step 808, the controller 108 or other suitable component associated with the document processing device 104 specifies the quantization of the L* axis. A skeletal gamut facilitates optimal choice of Theta values at which rays are projected in the a*b* plane at constant L*. This ensures that the Thetas that intersect the most vivid colors, that is, the corners of a given boundary, are sampled.

Flow then proceeds to step 810, whereupon a ray is cast at a given [L* theta] value from a selected pivot point, e.g., neutral axis, so as to build the sculpted gamut at a constant L* plane basis. At step 812, the controller 108 or other suitable component associated with the document processing device 104 locates the L*a*b* intersection with the CMY gamut and the CMYK gamut. The controller 108 or other suitable component associated with the document processing device 104 then determines, at step 814, the maximum black (K) and the minimum black (K) inking solutions for 5 points in a normalized (0-1) interval between the CMY gamut and the CMYK gamut. At step 816, the maximum black (K) and the minimum (K) values are plotted by the controller 108 or other suitable component associated with the document processing device 104. As the skilled artisan will appreciate, such a plot includes a Y-axis representative of a percentage black (K) and an X-axis representative of a normalized distance. A suitable example of such a plot is described in greater detail above with respect to FIG. 5.

At step 818, the controller 108 or other suitable component associated with the document processing device 104 computes fit points, which are a predetermined percentage, for example and without limitation 10%, between the minimum black (K) and the maximum black (K) values. A low order polynomial is then fit at step 820 and a determination is made at step 822 whether the computed points are monotonic. Upon a determination at step 822 that the points are not monotonic, flow proceeds to step 824 whereupon monotonicity is forced via fitting of a straight line, as will be understood by those skilled in the art. Upon a determination that the points are monotonic, or following forced monotonicity, flow progresses to step 826. At step 826, the controller 108 or other suitable component associated with the document processing device 104 obtains a fractional black (K) value for the ray. The controller 108 or other suitable component associated with the document processing device 104 then computes, at step 828, a sculpted black (K) value.

At step 830, the controller 108 or other suitable component associated with the document processing device 104 then uses the computed sculpted black (K) value and the minimum/maximum black (K) values to determine the desired L*a*b* value. A determination is then made at step 832 whether the L*a*b* value lies within the geometric bounds of the sculpted gamut, as defined by the CMY and the CMYK gamuts. When it is determined, at step 832, that the L*a*b* value does not fall within the geometric bounds of the sculpted gamut, operations proceed to step 834, whereupon a suitable correction algorithm is applied, namely clipping to the nearest gamut boundary. When it is determined at step 832 that the L*a*b* value does lie within the geometric boundaries of the sculpted gamut, flow proceeds to step 836, whereupon the forward model is inverted so as to obtain CMY inking solutions. The computed L*a*b*/CMYK value is then stored in associated storage, e.g., the data storage device 110, at step 838. Operations then proceed to step 840, whereupon a determination is made whether another theta/L* plane remains for processing. When no additional theta/L* planes remain, the operations with respect to the example implementation of FIG. 8 terminate. When one or more theta/L* planes remain, flow returns to step 810, whereupon a ray is cast a given L* theta value from a selected pivot point in association with the next theta/L* plane to be processed. Operations continue as set forth above until all theta/L* planes have been processed in accordance with the subject application.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A sculpted gamut color conversion system comprising:
    means for receiving first gamut data related to a first color gamut defined by a primary color space having no black component;
    means for receiving second gamut data related to a second color gamut defined by the primary color space inclusive of a black component;
    mapping means, including a processor and associated memory, for mapping at least one first color value of the first color gamut to a second color value of a portion of the second color gamut disposed outside of the first color gamut;
    selection means for selecting at least one fractional black component value for each mapped color value;
    means for identifying non-black color data associated with each selected fractional black component;
    means for generating a sculpted gamut in accordance with each selected fractional black component and associated non-black color data; and
    means for generating a color image corresponding to the sculpted gamut.

2. The system of claim 1 wherein the first gamut data corresponds to CMY device color space and wherein the second color gamut data corresponds to CMYK device color space.

3. The system of claim 2 wherein the fractional black component value is associated with a L* value and the non-black color data is associated with a*b* values of a color value specified in L*a*b*color space.

4. The system of claim 1 further comprising means for identifying ray data corresponding to a set of functionally related data points defined in accordance with the first gamut data and the second gamut data.

5. The system of claim 4 wherein the selection means includes means for selecting the at least one fractional black component in accordance with identified ray data.

6. The system of claim 5 wherein the selection means further includes means for selecting the at least one fractional black component in accordance with a saturation level associated with non-black color data associated therewith.

7. A sculpted gamut color conversion method comprising:
   receiving first gamut data related to a first color gamut defined by a primary color space having no black component;
   receiving second gamut data related to a second color gamut defined by the primary color space inclusive of a black component;
   mapping, using a processor and associated memory, at least one first color value of the first color gamut to a second color value of a portion of the second color gamut disposed outside of the first color gamut;
   selecting at least one fractional black component value for each mapped color value;
   identifying non-black color data associated with each selected fractional black component;
   generating a sculpted gamut in accordance with each selected fractional black component and associated non-black color data; and
   generating a color image corresponding to the sculpted gamut.

8. The method of claim 7 wherein the first gamut data corresponds to CMY color space and wherein the second color gamut data corresponds to CMYK color space.

9. The method of claim 8 wherein the fractional black component value is associated with a L* value and the non-black color data is associated with a*b* values of a color value specified in L*a*b*color space.

10. The method of claim 7 further comprising identifying ray data corresponding to a set of functionally related data points defined in accordance with the first gamut data and the second gamut data.

11. The method of claim 10 wherein selecting includes selecting the at least one fractional black component in accordance with identified ray data.

12. The method of claim 11 wherein selecting includes selecting the at least one fractional black component in accordance with a saturation level associated with non-black color data associated therewith.

13. A document processing device controller comprising a processor and storage medium storing a program having instructions which when executed by the processor will cause the processor to:
   receive a first color gamut defined by a primary color space having no black component and a second color gamut defined by the primary color space inclusive of a black component;
   map at least one first color value of the first color gamut to a second color value of a portion of the second color gamut disposed outside of the first color gamut;
   select at least one fractional black component value for each mapped color value;
   identify non-black color data for the at least one fractional black component;
   generate a sculpted gamut using the at least one fractional black component and the non-black color data; and
   generate a color image using the sculpted gamut.

14. The controller of claim 13 wherein the first color gamut is in a CMY color space and wherein the second color gamut is in a CMYK color space.

15. The controller of claim 14 wherein the at least one fractional black component value is associated with a L* value and the non-black color data is associated with a*b* values of a color value specified in an L*a*b*color space.

16. The controller of claim 13 wherein the instructions further cause the processor to identify ray data corresponding to a set of functionally related data points defined by the first color gamut and the second color gamut.

17. The controller of claim 16 wherein the instructions further cause the processor to select the at least one fractional black component based upon the ray data.

18. The controller of claim 17 wherein the instructions further cause the processor to select the at least one fractional black component based upon a saturation level of non-black color.

19. The controller of claim 13 wherein the instructions further cause the processor to output the color image using the document processing device.

* * * * *